Jan. 26, 1960   E. G. KALTENBACH   2,922,592
SECURING DEVICE

Filed April 5, 1956   2 Sheets-Sheet 1

INVENTOR:
ERNEST G. KALTENBACH
BY
ATTORNEY.

Jan. 26, 1960     E. G. KALTENBACH     2,922,592
SECURING DEVICE

Filed April 5, 1956     2 Sheets-Sheet 2

INVENTOR:
ERNEST G. KALTENBACH
ATTORNEY

United States Patent Office 2,922,592
Patented Jan. 26, 1960

2,922,592

SECURING DEVICE

Ernest G. Kaltenbach, Hendersonville, N.C., assignor, by mesne assignments, to Olin Mathieson Chemical Corporation, a corporation of Virginia Application April 5, 1956, Serial No. 576,284

1 Claim. (Cl. 242—68.2)

This invention relates to a device for securing a tube-like member such as a core for a roll of paper or the like to a shaft and more specifically to a chuck for centering and rigidly securing such a tube on a shaft.

In reeling sheets such as paper or similar material onto and off of a tube, it is necessary that the tube be mounted concentrically with its axis of rotation in order to prevent tearing or twisting the sheet. It is also necessary to prevent longitudinal movement of the tube with respect to the material being reeled to prevent tearing or twisting the material, and to assure that the material being wound onto a tube will have its edges aligned. A tube having concentric sockets in its ends may have longitudinally aligned chucks or dogs fixed into the sockets or a tube may have a shaft inserted through the hollow portion of the tube and be secured to the shaft by means of an expansible chuck or dog on the shaft at one or both ends of the tube. To prevent the engagement between an expansible chuck and a hollow tube from loosening during reeling operations, provisions must be made to lock the chuck in firm engagement with the interior of the tube. In order to prevent unnecessary damage to the tube and to prevent the engagement between the chuck and tube from loosening, the locking means should be entirely independent of any engagement between the tube and chuck. The engagement between the chuck and tube should be completely and positively released before attempting to remove the chuck from the tube. The expansible portion of the chuck should be positively retractable during the releasing operation so that the chuck may be removed without damage to the tube.

An object of this invention is to provide a device for quickly and easily securing a tube-like member to a shaft and for quickly and easily removing the tube from the shaft.

Another object of this invention is to provide a device for accurately centering and rigidly attaching a tube, such as forms the core of a heavy roll of paper, cellophane or other sheet material, to a shaft for the purpose of reeling such sheet material.

Another object of this invention is to provide a device for securing a tube-like member to a shaft, and in which the tube may be readily and positively released from the shaft.

Another object of this invention is to provide a device for centering a tube-like member on a shaft and for positively preventing rotation of the tube relative to the securing device.

Other objects and features of this invention will become apparent from the following description and drawings in which.

Figure 1:
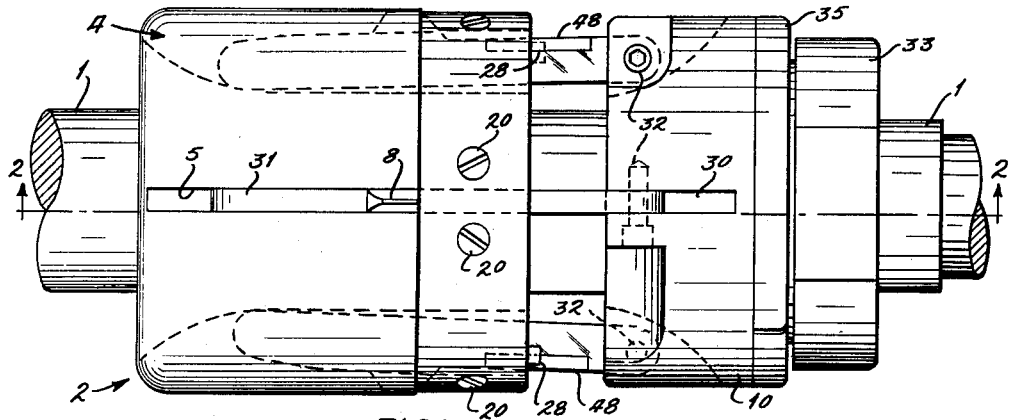
Figure 1 is a side view of a securing device fixed on a shaft and in the released position illustrating an embodiment of this invention.

Referring to the drawings, a threaded shaft 1 has concentrically secured thereon a chuck 2. A tube 3 is telescopically received over the chuck and is centered and rigidly positioned thereon by the chuck.

Figure 2:
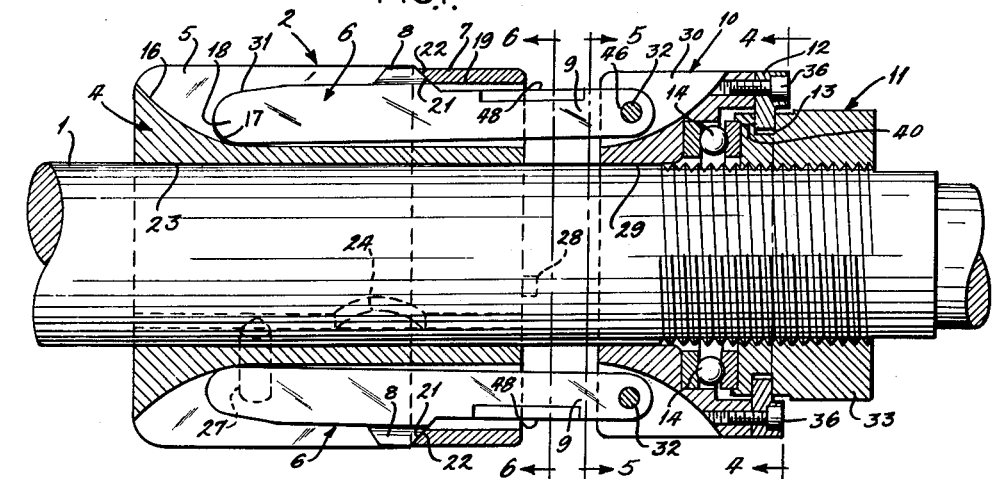
Figure 2 is a sectional view taken on the line 2—2 in Figure 1.

Referring particularly to Figure 2, a cylindrical body 4 is fixed to the shaft 1. The chuck body has a plurality of longitudinal slots 5 each slidably receiving an extensible member such as gripping finger 6 which is maintained in the slot by a ring 7 circumscribing the chuck body 4 and overlying the slots 5 and the gripping fingers 6. Each gripping finger 6 has a tube penetrating blade 8 projecting therefrom. In the retracted position shown in Figure 2 the blade 8 engages the ring 7 to further prevent removal of the fingers from the longitudinal slots 5 in the chuck body 4. One end 9 of each finger projects outwardly from its slot 5 and is pivotally connected to a collar 10 which is longitudinally movable on the shaft 1. The fingers 6 prevent rotation of the collar 10 relative to the chuck body 4. An action nut 11 is threaded to the shaft 1 and is longitudinally movable thereon. The collar 10 is rotatable relative to the action nut 11 and is secured thereto by a split ring 12 fixed to the collar and slidably received in a transverse groove 13 in the nut 11. A thrust bearing 14 is positioned between the collar 10 and the nut 11.

Figure 3:
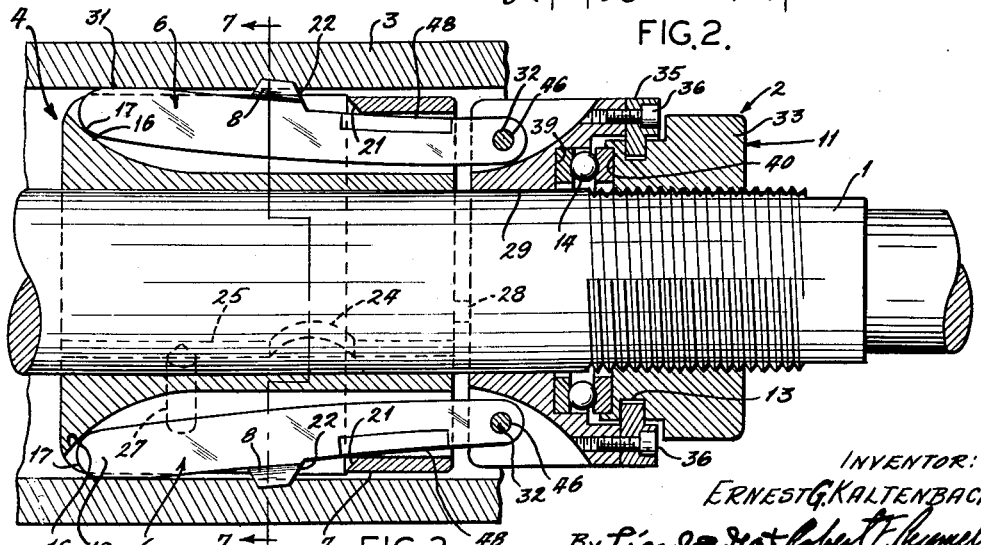
Figure 3 is a sectional view similar to Figure 2 but with a tube on the device and with the device locked in the extended, or tube or core engaging position.
Figure 4:
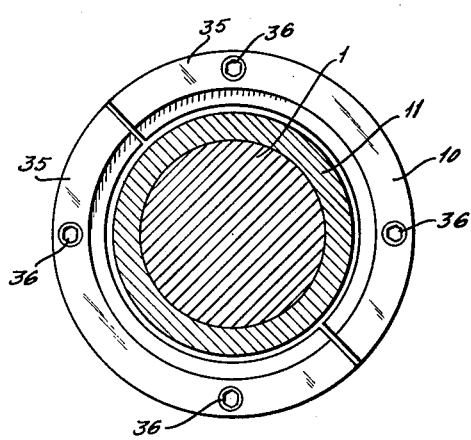
Figure 4 is a sectional view taken on the line 4—4 in Figure 2.
Figure 5:
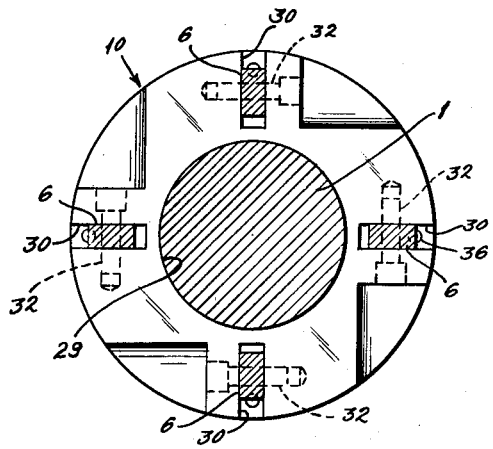
Figure 5 is a sectional view taken on the line 5—5 in Figure 2.

The operation of the chuck will be more fully described hereinafter, but briefly, rotation of the nut 11 in the threads of the shaft 1 from the position shown in Figure 2 toward the chuck body 4 moves the collar 10 toward the chuck body 4 causing the gripping fingers 6 to expand outwardly into gripping engagement with the tube 3 as shown in Figure 3.

Figure 6:
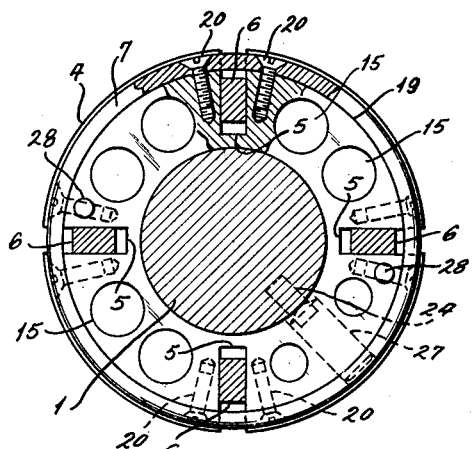
Figure 6 is a sectional view taken on the line 6—6 in Figure 2.
Figure 7:
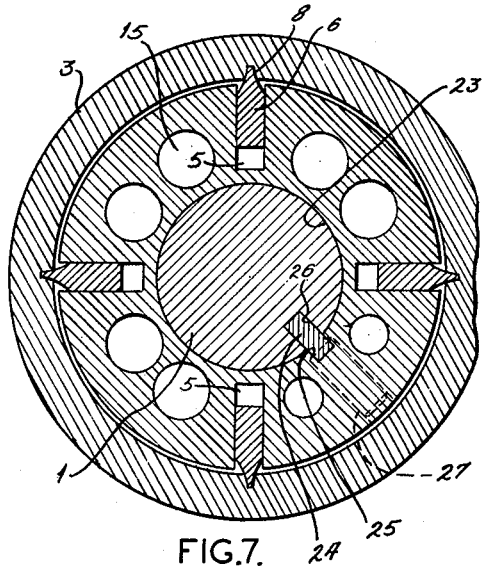
Figure 7 is a sectional view taken on the line 7—7 in Figure 3.

The chuck body 4 may be provided with longitudinal holes 15 as shown in Figures 6 and 7 to reduce the weight of the chuck. Each of the slots 5 has an outwardly arched gripping cam surface 16 which co-acts with a gripping cam surface 17 on a tube supporting end 18 on each of the gripping fingers 6. The ring 7 is received on a reduced cylindrical portion 19 on the end of the chuck body adjacent the collar. The ring 7 is secured to the chuck body 4 by a plurality of bolts 20 threaded into the chuck body. The inner end of the ring 7 has a releasing cam surface 21 which co-acts with a releasing cam surface 22 on the blades 8 which project from the gripping fingers 6 to positively retract the fingers into the slots 5. A concentric longitudinal bore 23 through the chuck body 4 snugly engages the shaft 1. The chuck body 4 is prevented from rotating on the shaft 1 by a key 24 slidably received in a longitudinal slot 25 in the wall of the concentric bore 23 and a notch 26 in the shaft 1. Longitudinal movement of the chuck body 4 relative to the shaft 1 is prevented by a set screw 27 threadably received in a bore in the chuck body and tightened down against the shaft. A pair of diametrically opposed stop pins 28 limit movement of the collar 10 toward the chuck body 4 and are tightly received in a pair of holes in the face of the chuck body adjacent the collar.

The collar 10 is slidably received on the shaft 1 by means of a longitudinal bore 29 in the collar. A plurality of longitudinal slots 30 corresponding to the longitudinal slots 5 in the chuck body 4 each receive end 9 of one of the gripping fingers 6. These ends are pivoted in the slots 30 by pivot pins 32 threaded into the collar 10. An action nut 11 is threadably received on the shaft 1 and has a transverse groove 13 in which a split ring 35 is rotatably received. The split ring 35 is secured to the collar by a plurality of bolts 36 threaded into the collar. A thrust bearing 14 is positioned between the collar 10 and the action nut 11 and is received in countersunk sockets 39 and 40, respectively, in each of these members. The main function of the thrust bearing 14 is to facilitate easier expansion of the gripping fingers 6 into operative engagement with the tube 3. This bearing also aids in releasing the fingers 6 by making the initial releasing turning of the nut head 33 easier. When the chuck is being tightened against the inner surface of the tube, the force of the nut 11 is directed through the thrust bearing 14 rather than through the split ring 35. In releasing the chuck from engagement with the tube the force of the nut 11 is directed through the inner surface 40 of the split ring 35. Except for easing the initial turning of the nut the thrust bearing plays no part in releasing the gripping fingers from engagement with the core.

Figure 8:
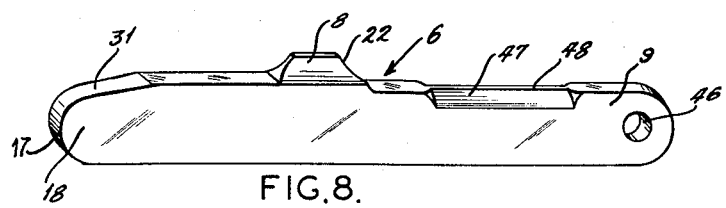
Figure 8 is a perspective view of one of the gripping fingers.

Figure 8 shows a perspective view of one of the gripping fingers 6. One end of each gripping finger provides a gripping cam surface 17 for engagement with the gripping cam surface 16 in the chuck body slot 5. Immediately adjacent this cam surface is the flat tapered tube supporting surface 31. The function of this surface is to support almost the entire weight of the tube and any material rolled thereon. Immediately inwardly of the tube supporting surface is an outward protrusion 8 tapered to form a relatively sharp blade which penetrates the tube 3 and prevents rotation of the tube relative to the chuck body 4, but supports very little weight of the tube, or the material thereon. The required longitudinal length and outward protrusion of the blade will, of course, depend on the strength of the material from which the tube is fabricated and the load to be supported by the chuck. The end 9 of the gripping finger 6 opposite the gripping cam surface 18 has a transverse aperture 46 which receives the pivot pin 32 in the collar 10. Intermediate the blade 8 and the aperture 46 a portion 47 of the edge of the gripping finger 6 is tapered to provide a binding surface 48 of reduced thickness for binding engagement with the ring 7. As the fingers are brought into gripping engagement with the tube this reduced surface 48 engages an edge of ring 7 and a slight additional tightening rotation of the action nut 11 causes this surface to bind tightly against the ring.

The arrangement of the various parts of the chuck provide a positive locking action within the chuck itself when the gripping fingers 6 are in operative engagement with the inner surface of the tube 3. This locking action is not dependent on engagement of any part of the chuck with the tube, thus protecting the tube from stresses not necessary for the support of the tube. Referring to Figure 3, it will be noted that the collar 10 is tightened against the stop pins 28. Engagement between the gripping cam surfaces 16 of the chuck body slots 5 and the gripping cam surfaces 17 of the gripping fingers 6 move the fingers outwardly so that the supporting end surfaces 31 of the fingers firmly engage the tube 3. During this outwardly movement the binding surface 48 of each gripping finger engages an inner edge of the ring 7 and thereafter a slight additional turning of the action nut 11 causes the gripping fingers 6 to be bowed slightly and to bind between the gripping cam surfaces 16 and 18, the pivot pin 46, and the binding surface 48 of the finger and the ring 7.

When it is desired to release the chuck from engagement with the tube, the action nut 11 is rotated on the threaded shaft 1 to move the nut away from the chuck body 4 thereby drawing the collar 10 away from the chuck body 4. The pivot pins 32 cause the gripping fingers to move outwardly through the slots 5 in the chuck body 4. However, both the gripping finger blades 8 and supporting end surfaces 31 would not necessarily be withdrawn from engagement with the tube 3 because of such outward movement of the gripping fingers 6. To positively release the gripping fingers from engagement with the tube co-acting releasing cam surfaces 21 and 22 are provided on the ring 7 and the blade 8, respectively, so that should the gripping fingers fail to disengage from the tube, engagement of the releasing cam surface will positively retract the fingers into the slots 5 and the chuck body 4.

The functioning of the chuck is as follows. With the chuck 2 in the retracted inoperative position shown in Figures 1 or 2, a hollow tube 3 is slid over the shaft 1 and the chuck 2. During emplacement of the tube the blades 8 on the gripping fingers 6 are below the outer surface of the chuck body 4. With the tube 3 properly positioned about the chuck 2, the action nut 11 is rotated in the threads on the shaft in a direction to move the nut toward the chuck body 4. The linear movement of the action nut 11 is transmitted through the thrust bearing 37 to the collar 10 which moves toward the chuck body 4. Until the gripping fingers 6 engage the tube 3, the action nut 11 may usually be turned by hand. After engagement of the gripping fingers 6 with the tube, the nut 11 is turned with a wrench until the collar 10 is firmly seated against the stop pins 28. During the latter rotation of the nut 11 the weight of the tube 3 is transferred from the periphery of the chuck body to the supporting surfaces 31 on the gripping fingers 6 while the blades 8 penetrate the tube 3. The gripping fingers 6 are locked in place in engagement with the tube by the binding action between the gripping cam surfaces 16 and 17, the pivot pins 32, and the ring 7 and binding surfaces 48 on the gripping fingers. To release the chuck from engagement with the tube, it is merely necessary to rotate the nut 11 with a wrench in a direction away from the chuck body to release the locking action after which the nut may usually be turned by hand until the gripping fingers are retracted into the chuck body.

Although this invention has been described with reference to a particular embodiment and details thereof, various modifications therein will be apparent to one skilled in the art and the invention is not to be limited to such embodiment or details except as set forth in the appended claim.

I claim:

A device for connecting or clutching a shaft to a hollow tube comprising a circular collar movably mounted upon the shaft, a plurality of fingers each having a tube penetrating blade and a tube bearing surface pivotly mounted upon the collar and disposed in circumferential array, a first cam means cooperating with the fingers for moving the blades in a radially outward direction whenever the collar is moved axially along the shaft in a pre-determined direction whereby the blades penetrate the tube, a second cam means cooperating with the blades for moving the blades in a radially inward direction whenever the collar is moved oppositely to said pre-determined direction and ring means cooperating with said fingers for limiting the outward motion of the fingers thus limiting the penetration of the blades.

References Cited in the file of this patent

UNITED STATES PATENTS

| 728,486 | Meisel | May 19, 1903 |
|---|---|---|
| 1,016,738 | Curry | Feb. 6, 1912 |
| 1,333,632 | Robinson | Mar. 16, 1920 |
| 1,686,102 | Peterson | Oct. 2, 1928 |
| 1,698,153 | Collingbourne | Jan. 8, 1929 |
| 1,964,585 | Larsen | June 26, 1934 |
| 2,562,658 | Bonebrake | July 31, 1951 |
| 2,734,691 | Godat | Feb. 14, 1956 |

FOREIGN PATENTS

| 855,420 | France | Feb. 12, 1940 |